R. J. EVANS.
LINING FOR RAILWAY CARS AND OTHER BUILDINGS.
APPLICATION FILED SEPT. 30, 1910.
1,116,351.   Patented Nov. 3, 1914.
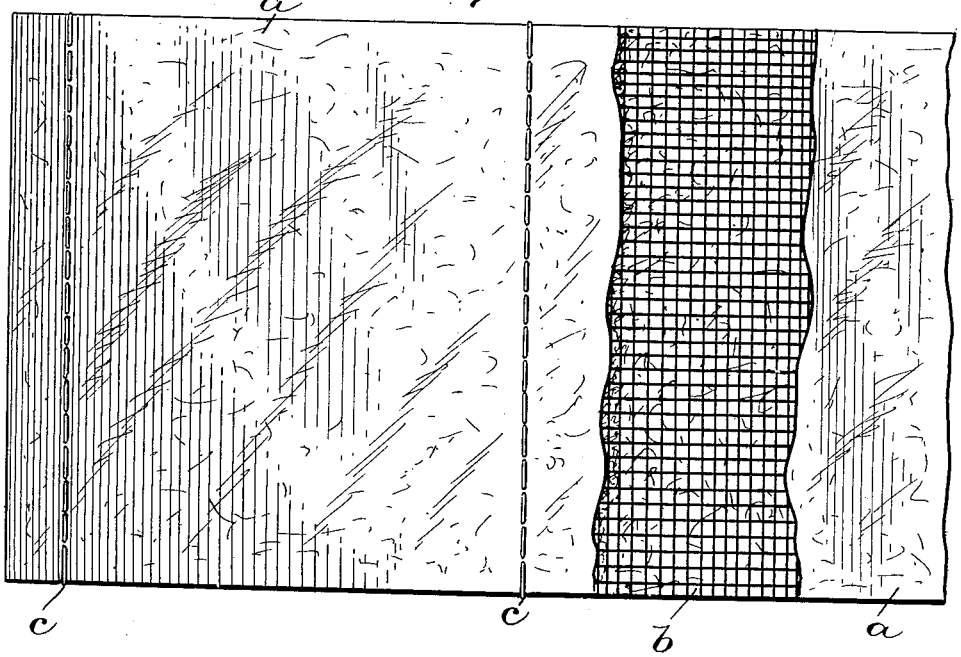
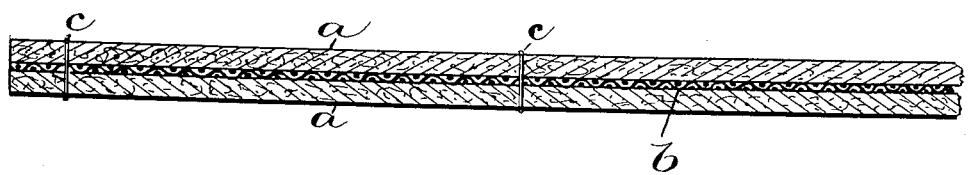
Richard J. Evans, Inventor
Witnesses
J. M. Fowler Jr.
H. F. Ruth
By W. B. Corwin,
Attorney

UNITED STATES PATENT OFFICE.

RICHARD J. EVANS, OF FRANKLIN, PENNSYLVANIA, ASSIGNOR TO FRANKLIN MANUFACTURING COMPANY, OF FRANKLIN, PENNSYLVANIA, A CORPORATION OF PENNSYLVANIA.

LINING FOR RAILWAY-CARS AND OTHER BUILDINGS.

1,116,351.      Specification of Letters Patent.      Patented Nov. 3, 1914.

Application filed September 30, 1910. Serial No. 584,631.

*To all whom it may concern:*

Be it known that I, RICHARD J. EVANS, a citizen of the United States of America, residing at Franklin, in the county of Venango and State of Pennsylvania, have invented a new and useful Improvement in Linings for Railway-Cars and other Buildings, of which the following is a specification.

My invention relates to a non-heat conducting and incombustible or fireproof fabric which is at the same time an efficient deadener of sound, and is designed for use as a lining for railway cars, particularly metallic cars, and other buildings.

What I consider at present the best form of structure embodying my invention is shown in the accompanying drawing, forming part of this specification, in which—

Figure 1 is a plan view with parts broken away; and Fig. 2 is a longitudinal section of Fig. 1.

In the several figures like letters of reference indicate like parts.

In the drawing, *a, a*, represent layers of soft, elastic, flexible asbestos of loose texture. Between these layers of asbestos is interposed a layer of fabric *b*, preferably open-mesh gunny cloth or burlap, or other suitable material, the whole being pressed together. The layers of asbestos *a, a*, and the layer of gunny cloth or burlap *b* are preferably stitched together with asbestos cord *c*, to give the structure strength and prevent any possibility of the separation of the various layers, or their sliding with relation to each other.

It will be understood that there may be any desired number of layers of asbestos and interposed fabric, as I do not limit myself to the number shown in the drawing.

My improved fabric lining is cheap, flexible, strong, and incombustible. It is useful generally as a lining for walls, ceilings, and floors, and is especially adapted as a lining for steel railway coaches, as it effectually prevents sweating and radiation of heat and cold, and is also an efficient sound deadener or insulator. It can be readily cemented or glued to steel plates and does not absorb moisture as do the ordinary forms of car linings now in use. Being made of asbestos fiber in a manner somewhat similar to that by which pulp board is formed, the asbestos layers have quite a loose texture, are very light, and are capable of containing a large percentage of confined air.

I claim:—

1. A heat-insulating and fireproof lining fabric composed of a plurality of layers of unwoven asbestos fiber of a loose texture and an interposed layer of open-mesh cloth.

2. A heat-insulating and fireproof lining fabric composed of a plurality of layers of unwoven asbestos fiber of a loose texture and an interposed layer of open-mesh cloth, the said layers of asbestos fiber and open-mesh cloth being pressed together.

3. A heat-insulating and fireproof lining fabric composed of a plurality of layers of unwoven asbestos fiber of a loose texture and an interposed layer of open-mesh cloth, the said layers of asbestos fiber and open-mesh cloth being pressed together and then stitched together.

4. A heat-insulating and fireproof lining fabric composed of a plurality of layers of unwoven asbestos fiber of a loose texture and an interposed layer of burlap, the said layers of asbestos fiber and burlap being pressed together and then stitched together with asbestos thread.

In witness whereof I have hereunto set my hand in the presence of two subscribing witnesses.

RICHARD J. EVANS.

Witnesses:
J. R. GRUNDY,
WM. S. TAFT.